(12) United States Patent
Hilderley et al.

(10) Patent No.: US 7,520,293 B2
(45) Date of Patent: Apr. 21, 2009

(54) FUEL STORAGE SYSTEM FOR A VEHICLE

(75) Inventors: Steven R. Hilderley, LaSalle (CA); James R. Osborne, Davisburg, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 325 days.

(21) Appl. No.: 11/355,391

(22) Filed: Feb. 16, 2006

(65) Prior Publication Data
US 2007/0186976 A1 Aug. 16, 2007

(51) Int. Cl.
*F16K 24/04* (2006.01)
*F16K 31/18* (2006.01)

(52) U.S. Cl. .................. 137/202; 137/578; 220/746

(58) Field of Classification Search ............ 137/202, 137/578, 423, 577, 590, 43; 220/745, 746
See application file for complete search history.

(56) References Cited

U.S. PATENT DOCUMENTS

| 5,375,633 | A | | 12/1994 | Bucci |
| 5,437,491 | A | * | 8/1995 | Nedbal et al. ............ 296/97.22 |
| 5,647,331 | A | | 7/1997 | Swanson |
| 6,145,532 | A | | 11/2000 | Tuckey et al. |
| 6,213,100 | B1 | | 4/2001 | Johansen |
| 6,276,387 | B1 | * | 8/2001 | Pachciarz et al. ............. 137/43 |
| 6,302,137 | B1 | * | 10/2001 | Devall ......................... 137/202 |
| 6,431,195 | B1 | * | 8/2002 | Parker et al. .................... 137/2 |
| 6,848,463 | B2 | | 2/2005 | Johansen |
| 6,957,658 | B2 | * | 10/2005 | Aschoff et al. .............. 137/202 |
| 2006/0086388 | A1 | * | 4/2006 | Fye ............................. 137/202 |

* cited by examiner

*Primary Examiner*—John Rivell
*Assistant Examiner*—Atif H Chaudry
(74) *Attorney, Agent, or Firm*—Reising, Ethington, Barnes, Kisselle, P.C.

(57) ABSTRACT

A fuel storage system for a transportation or recreational vehicle has a fuel tank that carries a vapor assembly that seeks out vapor pockets and controllably removes fuel vapor from the tank without releasing hydrocarbons to the surrounding environment. Preferably, a vent manifold attaches to a flange that sealably covers an access hole of the tank. At least one flexible tentacle extends from the manifold in the tank to a respective vapor vent valve that floats upon the surface of fuel at a vapor dome. When freely floating, the vent valve is open thus communicates the vapor dome through the tentacle and preferably with a filtering carbon canister. As fuel surface levels change or the vehicle tilts, changing the vapor dome size or location in the tank, the floating vapor vent valve is free to move generally with the vapor dome and as permitted by the flexibility of the trailing tentacle. With tank orientations where the vapor vent valve falls below the surface of fuel, the vent valve automatically closes to prevent flooding of the respective tentacle and remote vapor canister.

18 Claims, 6 Drawing Sheets

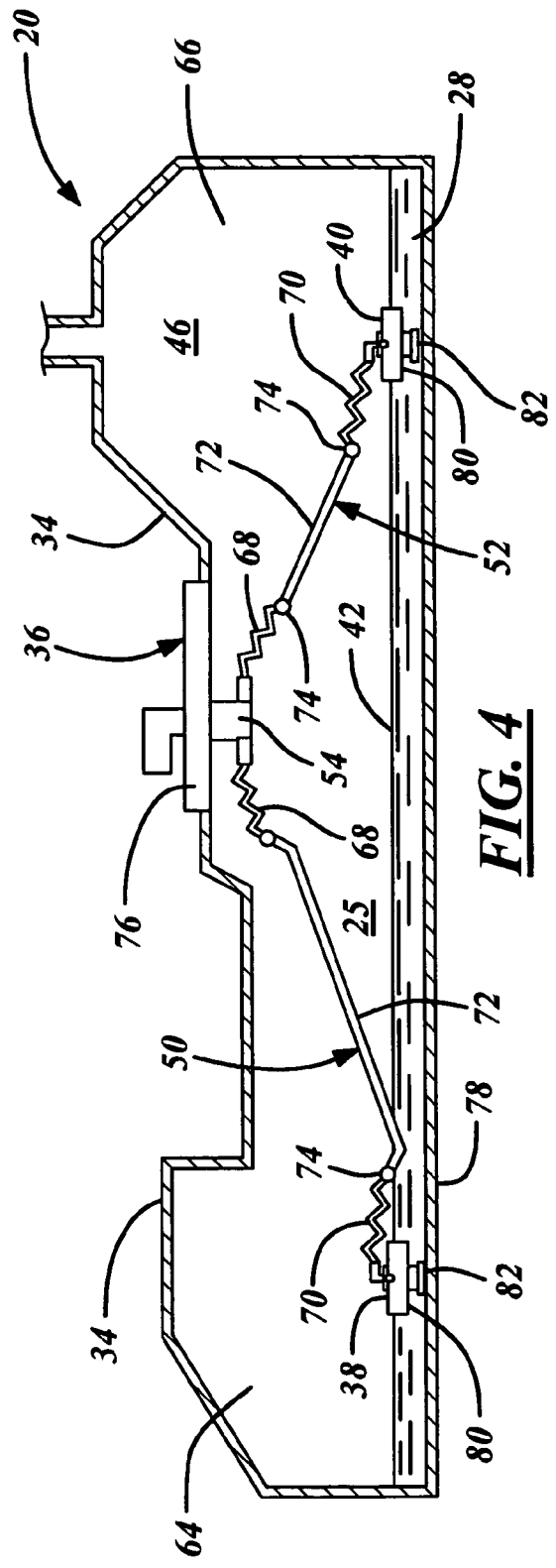
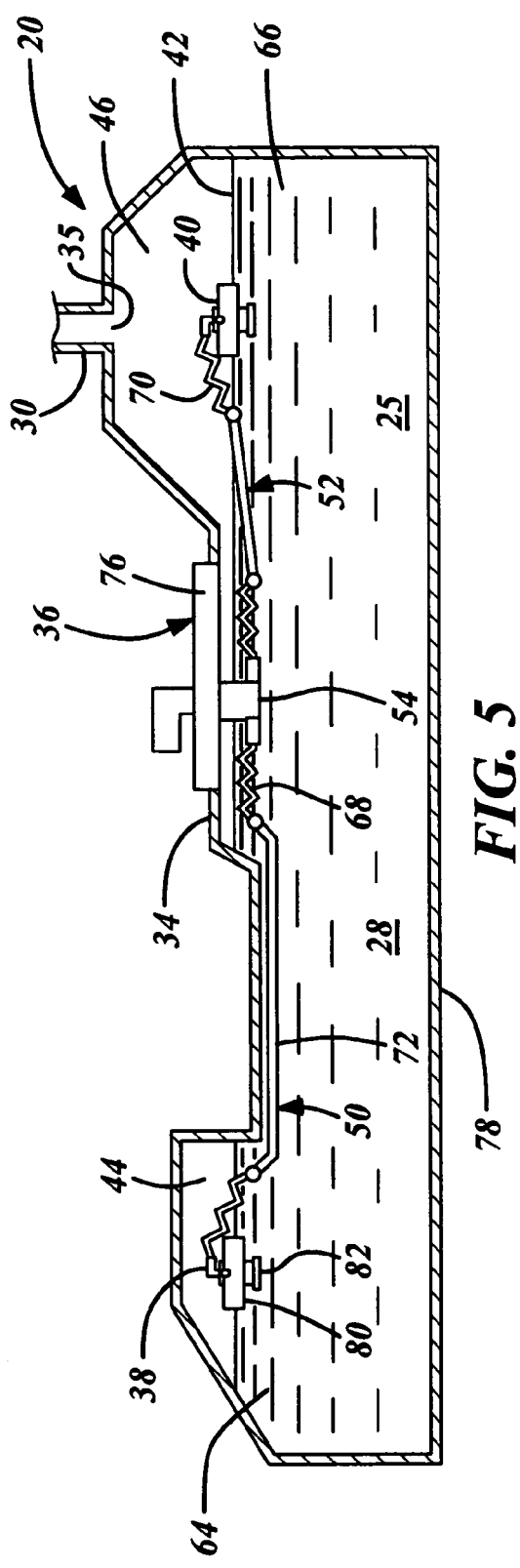

FUEL STORAGE SYSTEM FOR A VEHICLE

FIELD OF THE INVENTION

The present invention relates to a fuel storage system for a vehicle and more particularly to a fuel level vapor assembly of the fuel storage system.

BACKGROUND OF THE INVENTION

Environmental concerns and governmental regulations require reduced emissions of volatile hydrocarbon fuel vapors into the atmosphere. One source of hydrocarbon fuel vapors is the fuel tanks of vehicles using gasoline or other hydrocarbon fuels with high volatility. Fuel vapor can escape to the atmosphere during the filling of the tanks and usually even after the tanks are filled.

The use of an onboard vapor recovery system to remove excess fuel vapor from the fuel tank is one solution to the problem. Typically, a canister with activated charcoal therein receives fuel vapors through a vent valve mounted in the top of the fuel tank or within a flange of an in-tank fuel pump module for communication with a vapor dome in the tank. The vent valve is usually responsive to the level of fuel in the tank and will generally stay open provided the fuel level within the tank is sufficiently low. When open, fuel vapors flow freely from the fuel tank into the canister. Some vent valves are referred to as fill-limit vent valves or FLVV, because when the fuel tank of the vehicle is being refueled by a automatic shut-off fuel pump nozzle, the fuel level rises until a predetermined maximum level is reached. This maximum level generally preserves a minimum size vapor dome above the fuel.

For refueling purposes of the fuel tank, a filler tube generally extends substantially downward to the tank and communicates directly with the tank at an opening. When following common government regulatory requirements that a vehicle must generally sit within about a plus or minus three degree angle to a horizontal plane, the filler tube opening at the tank is commonly located above the maximum fuel level and communicates with the minimum size vapor dome. This relationship assures that when nearing maximum fuel level and before the FLVV closes, a backpressure is not created in the filler tube at the opening, because such a backpressure would cause liquid fuel to gurgle or backup in the filler tube. Such a backup could cause the automatic shut-off fuel pump nozzle to prematurely shut-off before maximum fuel level is reached.

During refueling of the vehicle and as the fuel level rises to a predetermined maximum level, a float of the vent valve rises with the fuel level to close the valve thus preventing liquid fuel from flowing through the vent valve and into the vapor receiving canister. Two such vent valves are disclosed in U.S. Pat. Nos. 6,145,532 and 6,848,463, and incorporated herein by reference in their entirety.

Known vapor vent valves are typically mounted rigidly to the fuel tank at substantially the highest elevation to vent away most of the fuel vapor to the canister during refueling when the tank or vehicle is generally at a horizontal position to thereby control the minimum volume of the vapor dome. Regardless of whether the combustion engine is running, the open vent valves allow air and fuel vapor, but not liquid fuel, to flow from the tank and to the canister. When the combustion engine is running and fuel is being displaced from the tank, a one-way venting check valve preferably vents fresh air to the enlarging vapor dome in the tank while air and fuel vapor may continue to flow through the open vent valve(s), then through the canister and to the running engine to maintain substantially constant pressure in the fuel tank.

Unfortunately, if the tank has two vapor domes or two high elevation points, known fuel storage systems having only one fixed vent valve can vent only one of the vapor domes. Because the vapor in the other vapor dome can not be displaced with fuel, the storage capacity of the tank is undesirably limited. Moreover, if the vehicle is traveling down or up a steep embankment, the tank is no longer generally horizontal and a substantially full tank of fuel could submerge the float of the fixed vent valve thus closing the vent valve while the engine is operating. With the vent valve closed and the engine consuming fuel or with the fuel being heated by a return loop fuel system, constant internal pressure of the tank is disrupted and engine performance may be degraded.

Moreover, for off-road vehicle applications that require gravity fed manual refueling operations (i.e. from a portable five gallon gas can), the vehicle may not be sitting within a plus or minus three degree angle from a horizontal plane as required for automatic shut-off pump refueling operations. Instead, the vehicle could be tilted at a much greater angle causing the FLVV to close considerably before the vapor dome is reduced to a minimum volume. Although premature closure of the FLVV on its own may not pose a filler tube backup problem during a manual refueling operation because supply fuel typically flows through the filler tube at a much slower rate, trapped air and fuel vapor in the tank can greatly reduce it's liquid fuel storage capacity when the tank is orientated at excessive angles away from the horizontal plane. That is, with the FLVV closed, and once the filler tube opening at the tank is immersed in liquid fuel, and air and vapor remaining in the tank is trapped. The volume of this trapped air and vapor may greatly exceed the minimum required volume of the vapor dome.

SUMMARY OF THE INVENTION

A fuel storage system for a passenger, transportation or recreational vehicle has an on-board fuel tank that carries a self-referencing vapor assembly for seeking out vapor pockets and controllably removing fuel vapor from the tank. Preferably, a vent manifold attaches to a flange that sealably covers an access hole of the tank. At least one flexible vapor line extends from the manifold in the tank to a vapor vent valve that floats upon the surface of fuel. When floating upon the fuel surface, the vapor vent valve is open to communicate the vapor dome through the vapor line and preferably with a carbon canister for hydrocarbon storage. As fuel surface levels change or the vehicle tilts, changing the vapor dome size or location in the tank, the floating vapor vent valve is sufficiently free to move generally with the vapor dome and as permitted by the flexibility of the vapor line. In tank orientations where the vapor vent valve falls below the surface of fuel, the vent valve automatically closes to prevent flooding of the respective vapor line and remote vapor canister or other downstream component.

Objects, features, and advantages of this invention include the ability of a vehicle to travel over substantially sloped terrain for prolonged periods of time without degrading the performance of the combustion engine, greater flexibility in the shape of vehicle fuel tanks to conform to available space while maximizing liquid fuel storage volume, the ability to vent multiple vapor domes in a fuel tank simultaneously, improved fuel tank pressure control, reduced hydrocarbon emission into the environment by reducing the number of required tank penetrations and greater flexibility in the location of a fuel tank penetration for routing a vapor line to the vapor canister. Furthermore, the fuel storage system is relatively light weight, relatively simple in design, reliable, durable, rugged and in service has a long useful life.

BRIEF DESCRIPTION OF THE DRAWINGS

These and other objects, features and advantages of this invention will be apparent from the following detailed description of preferred embodiments, appended claims and accompanying drawings in which:

FIG. 4 is a cross section of the fuel tank assembly illustrating the fuel storage system at a low fuel level;

FIG. 5 is a cross section of the fuel tank assembly at an intermediate fuel level;

DETAILED DESCRIPTION OF PREFERRED EMBODIMENTS

Figure 1:
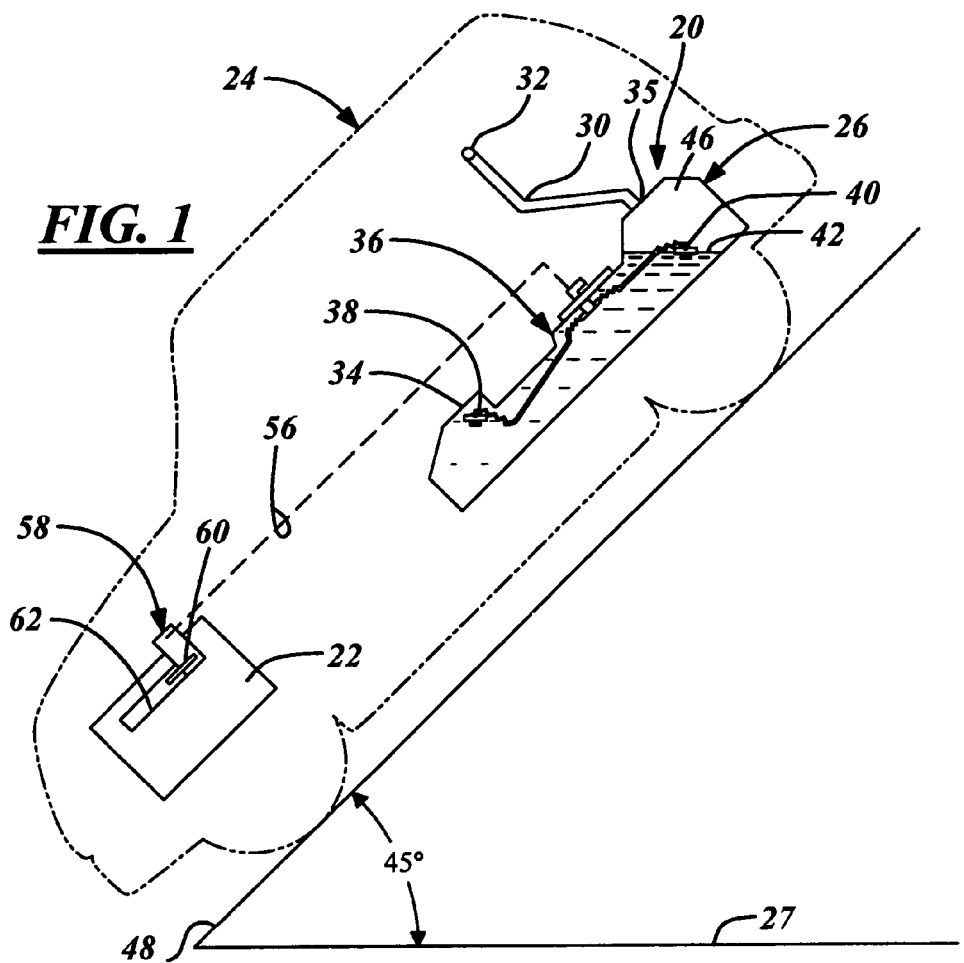
FIG. 1 is a diagrammatic view of one presently preferred embodiment of a fuel storage system illustrated in an automotive vehicle at a front-to-back angle of forty-five degrees to a horizontal plane.

As best illustrated in FIGS. 1-5, a fuel storage system 20 according to one embodiment of the present invention generally stores on-board fuel for use in a combustion engine 22 of a vehicle 24. During normal refueling operations of the vehicle 24 when typically at a refueling station, a remote fuel pump having an automatic shut-off fuel pump nozzle is designed to quickly and conveniently refuel a tank 26 of the fuel storage system 20. When refueling at the station, government regulatory requirements dictate that an incline 48 of the vehicle 24, and thus generally the on-board fuel tank 26, falls within an approximate angular range of plus and minus three degrees with reference to an imaginary horizontal plane 27 (herein referred to as on-road refueling and best illustrated in FIG. 2). When refueling the tank 26 within this angular range, the fuel storage system 20 must receive the supply fuel at a predetermined high volumetric flow rate through a fill tube 30 without creating spit-back or a back pressure in the tube that would inhibit the supply fuel flow or release hydrocarbons to the surrounding environment. Moreover, when the fuel tank 26 becomes full, a back pressure of fuel is created in the fill tube 30 that is sensed by the fill nozzle which automatically shuts off the remote fill pump. This automatic shut-off occurs while maintaining a minimum or primary fuel vapor dome 46 in the tank that is vented by a vapor assembly 36.

Figure 3:
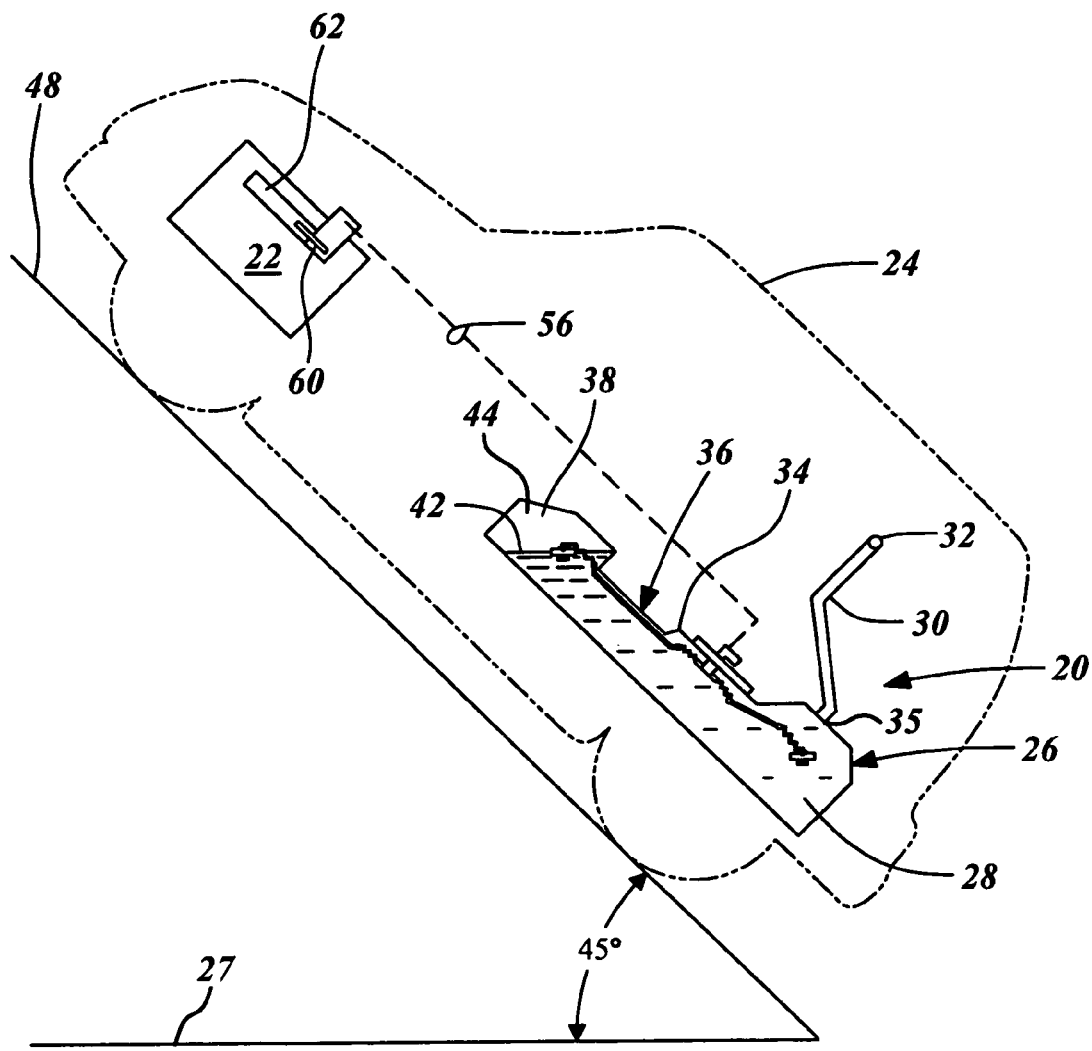
FIG. 3 is a diagrammatic view of the fuel storage system when the vehicle is at a back-to-front angle of forty-five degrees to a horizontal plane.

During less frequent off-road refueling operations of the fuel tank 26, the automatic shut-off fuel pump of a fuel station is not available and the tank 26 most be filled manually typically by the vehicle operator and commonly by dispensing liquid fuel from at least one portable fuel can often having a storage capacity of about five gallons (herein referred to as off-road refueling, and best illustrated in FIGS. 1 and 3). During off-road refueling and engine operation, the incline 48 of the vehicle 24 may fall considerably outside of the angular range of plus and minus three degrees from the horizontal plane 27. This greater angular orientation could effect the flow performance of the fill tube 30 creating a back pressure in the tube, however, because the supply fuel is gravity fed into the fill tube 30 and because of flow inhibiting characteristics of portable fuel cans, the flow rate into the tank is considerably less than that from a remote fuel pump, therefore spit back of fuel out of the vehicle is unlikely and any surges of back pressure while filling the tank 26 will not operate to cut-off supply fuel manually flowing into the tank.

When manually refilling the tank 26, it is the operator's responsibility to stop the filling operation before fuel overflows out of the filler tube 30. Preferably, however, the vapor assembly 36 is constructed and arranged to maintain the minimum vapor dome 46 volume during off-road refueling while maximizing the fuel storage capacity of the tank 24 regardless of incline 48. Preferably then, an inlet 32 at one end of the fill tube 30 is located at a sufficient height above an opening 35 in a top wall or ceiling 34 of the tank and at an opposite end of the fill tube 30 to enable off-road refueling of the tank 26 to its maximum liquid fuel storage capacity at a maximum predetermined incline 48 of the vehicle 24 from the imaginary horizontal plane 27 that is generally parallel to an upper fuel surface 42.

Referring to FIGS. 4 and 5, the fuel tank 26 has the primary vapor dome or pocket 46 and preferably at least one secondary vapor dome or pocket 44. The vapor domes 44, 46 are defined between the fuel surface 42 and the tank wall 34. The combined volume of the vapor domes 44, 46 when the tank 24 is filled with liquid fuel to a maximum capacity preferably meets the predetermined minimum vapor dome volume to compensate for thermal expansion of the stored liquid fuel 28 provided both domes are vented. If any one vapor dome is vapor locked or un-vented, its volume generally does not contribute toward the minimum volume required for the vapor domes. Preferably, for smooth engine operation, the vapor assembly 36 is capable of venting at least dome 44 or dome 46 when incline 48 is at least plus or minus thirty degrees and preferably as high as plus or minus forty-five degrees.

The quantity, size and placement of the vapor domes 44, 46 in the tank 26 is dependent upon the shape of the tank 26, the angular position or incline 48 of the tank 26 relative to the imaginary horizontal plane 27 at any given time and the quantity of fuel stored in the tank. Preferably, during on-road refueling, the primary vapor dome 46 is in communication with the fill tube opening 35 throughout the refueling operation. This assures that a back pressure of fuel is not created at the opening 35 during the high flow rate of fuel coming from the refueling pump nozzle that could cause premature automatic shut-off of the remote fuel pump. Preferably, when the tank reaches maximum capacity during on-road refueling, the primary vapor dome 46 of the fuel storage system 20 is the only remaining vapor dome and consequently, alone, comprises the minimum vapor dome volume. Such a relationship has the benefits of substantially alleviating any premature fuel backup concerns in the filler tube 30 and maximizing the fuel storage capacity of the tank 26 while minimizing its size for packaging to the vehicle 24.

The fuel storage system 20 also has a self-referencing vapor assembly 36 that generally allows vapor and air to exit the tank 26 as supply fuel 28 enters, and generally allows the tank 26 to breathe during normal vehicle use at a prescribed internal pressure that may or may not be atmospheric. The vapor assembly 36 has one and preferably a plurality of buoyant vapor vent valves 38, 40 that generally float with limited freedom upon the fuel surface 42 in the tank 26 and in the associated at least one vapor dome or pocket 44, 46. The vapor vent valves 38, 40 are in an open position when not otherwise submerged to a sufficient degree against their own buoyant force. Preferably, any one vent valve is capable of permitting a sufficient flow rate of vapor and air out of the tank 26 to prevent the filler tube 30 from prematurely backing-up with liquid fuel that could prematurely shut-off the remote fuel pump and nozzle during on-road refueling, and/or to displace sufficient vapor from the vapor domes with fuel to maximize tank storage capacity. In-other-words, during on-road refueling with the primary vapor dome 46 in communication with the opening 35 of the filler tube 30 and provided at least one of the plurality of vapor vent valves 38, 40 is open, additional supply fuel can be added through the filler tube 30 without premature actuation of the automatic shut-off of the remote refueling pump nozzle.

The free floating movement of the vapor vent valves 38, 40 is generally limited by flexible vapor lines or tentacles 50, 52 that generally extend from a vapor manifold 54 and to each respective one of the vapor vent valves 38, 40. When a vapor vent valve is in its open position, vapor can flow from the respective vapor dome 44, 46, through the respective tentacle 50, 52, out of the tank 26 via the manifold 54 and through a common conduit 56 that extends to a vapor canister 58. Preferably, the manifold 54 is in the tank and is formed as one unitary piece with a flange 76 that covers and seals an access hole in the tank 26. The canister 58 is preferably filled with an activated charcoal to absorb the hydrocarbon vapors received from the vapor vent valves 38, 40 and discharges the vapor through an outlet port 60 into the intake manifold 62 of the operating engine 22. The interior of the canister 58 may be directly vented to the atmosphere through a port in the canister (not shown) or indirectly through a vent to the interior of the fuel tank and preferably to a vapor dome area. The canister 58 may be mounted in the vehicle 24 adjacent or spaced from the fuel tank 26 or in the fuel tank and the conduit 56 and the 'intake manifold connection' can be made by suitable flexible hoses.

Figure 6:
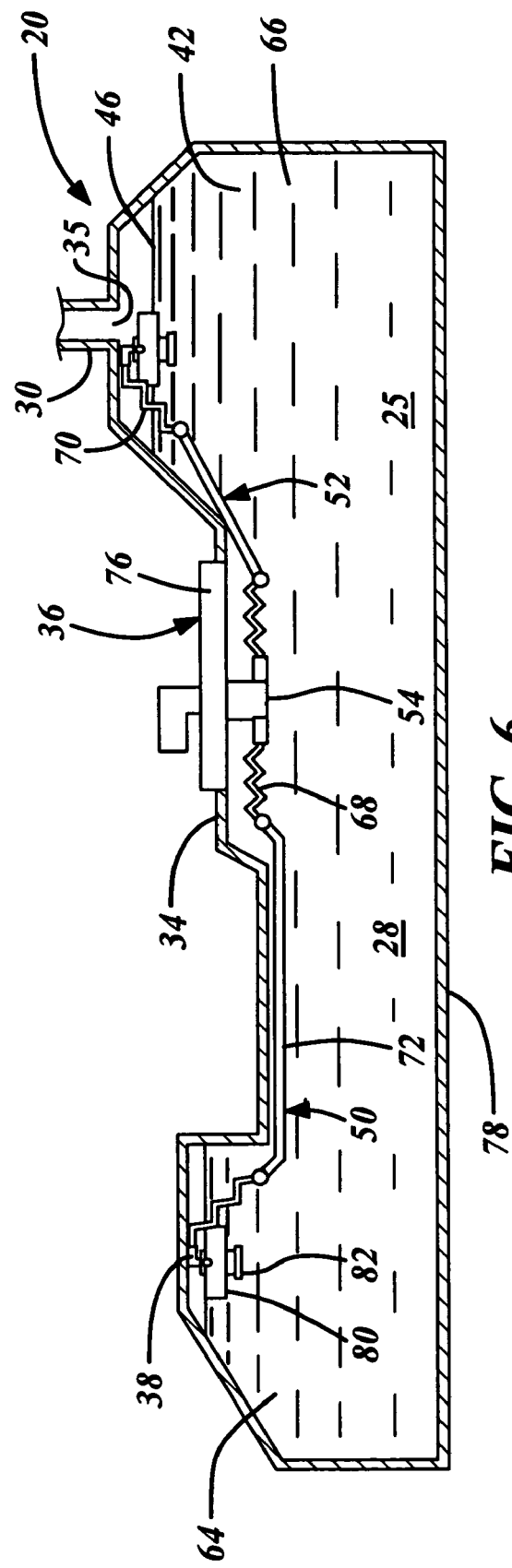
FIG. 6 is a cross section of a fuel tank assembly illustrating the fuel storage system at a high fuel level.

As best illustrated in FIGS. 4-6, the vapor assembly 36 has at least one and preferably two buoyant vapor vent valves 38, 40, one located in a first portion 64 of the fuel tank 26 and one located in a second portion 66 spaced from the first portion 64. The tentacles 50, 52 are flexible enough to allow the vapor vent valves 38, 40 to relatively freely float in the liquid fuel and move up and down with the changing level of the liquid fuel through a distance that is generally equivalent to the height of the respective portions 64, 66 of the fuel tank 26. Preferably, each vapor vent valve 38, 40 is also free to float laterally (from side-to-side) with respect to the fuel tank 26. This degree of freedom allows each vapor vent valve 38, 40 to seek out an associated vapor dome 44, 46 that may generally shift within the tank 26 and with changing road angles of inclination 48 and camber that the vehicle 24 is subject to. Depending upon the shape of the fuel chamber 25, the extent of flexibility of the tentacles may vary. As illustrated, each tentacle 50, 52 has corrugated flexible end portions 68, 70 and a rigid mid portion 72. The rigid mid portion 72 connects to each of the corrugated end portions 68, 70 preferably by flow-through swivel joints 74 (see FIG. 4). However, if the corrugated end portions 68, 70 provide sufficient flexibility one or both of the swivel joints 74 can be fixed.

Figure 2:
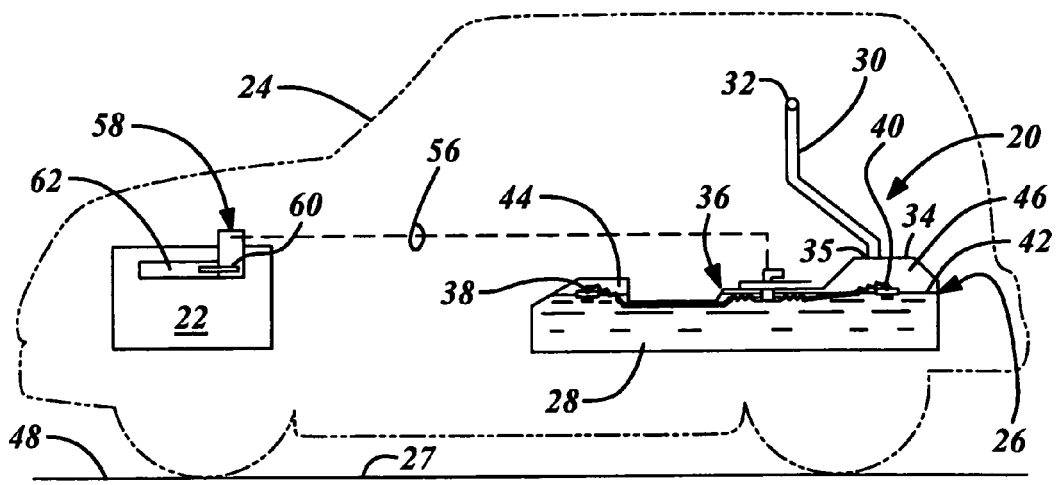
FIG. 2 is a diagrammatic view of the fuel storage system when the vehicle is level with the horizontal plane.

In FIGS. 4-6 the fuel tank 26 is shown substantially level or horizontal reflecting a vehicle 24 sitting at an incline 48 of about zero degrees (see FIG. 2). The wall 34 of the tank 26 is contoured to achieve a close fit to the undercarriage of the vehicle 24 while maximizing fuel storage capability. Referring to FIG. 4, the fuel tank 26 is substantially empty of fuel 28, thus one large, continuous vapor dome 46 that far exceeds the predetermined minimum volume is defined over the fuel surface 42. The vapor dome 46 communicates directly with the fill tube opening 35 and the vapor vent valves 38, 40 generally bob or float near the bottom of the tank 24 in an open position for venting air and fuel vapor to the canister 58. Each vapor vent valve 38, 40 preferably has a bottom bumper 82 to dampen any noise created when the valves rest on or impact the bottom 78 of the tank 26.

Referring to FIG. 5, the fuel tank 26 is almost but not quite full. Due to the contour of the tank wall 34, two separate vapor domes 44,46 are defined in the fuel tank 26. The primary vapor dome 46 communicates with the fill tube opening 35 and because both respective vapor vent valves 38, 40 are still open (see FIG. 7), the air and fuel vapor in each dome is not trapped and can be vented from the tank. Since the vapor vent valves 38, 40 are still open, the fuel tank 26 is still capable of receiving more supply fuel without significantly, if at all, increasing the pressure within the tank. This reduces or eliminates the likelihood that fuel will backup in the filler tube 30.

Referring to FIG. 6, the fuel tank 26 is full. In this particular illustration, the secondary vapor dome 44 has essentially been vented away by the now closed vent valve 38 and the primary vapor dome 46 is approximately at the predetermined minimum volume hence the second vapor vent valve 40 is also closed. Preferably, and particularly for on-road refueling, the second vent valve 40 located in the primary vapor dome 46 closes after the first vent valve 38 because closure of the second vent valve 40 first could create a back pressure at the opening 35 adjacent to the primary vapor dome 46 causing fuel to backup in the filler tube 30 and the remote fuel supply pump to prematurely shut-off automatically.

Referring to FIG. 2, the fuel tank 26 is shown in the environment of the vehicle 24 being substantially level and the tank 26 almost full as previously described and shown in FIG. 5. Both the forward and rearward vapor domes 44, 46 are generally below the fill tube 30 and are vented by their respective vapor vent valves 38, 40. As illustrated in FIG. 1, with the same amount of fuel, and with the vehicle 24 driving down, or parked on, about a forty-five degree incline 48, the forward vapor dome 44 is gone (filled with liquid fuel) and all the air and vapor in the tank has collected in the rearward portion 66, thus enlarging the vapor dome 46 of the tank 26. The forward vapor vent valve 38 being restricted in movement to the forward portion 64 is submerged in liquid fuel and thus closed, however the rearward vapor vent valve 40 remains floating and thus open. With the vent valve 40 open, the fuel storage system 20 is able to maintain substantially constant or a suitable range of tank pressure and thus, the steep incline 48 will not adversely effect engine performance. Similarly, FIG. 3 illustrates the vehicle 24 on an upward incline 48 of about forty-five degrees with the same amount of fuel as in FIG. 2. On the upward forty-five degrees incline 48, the rearward or primary vapor dome 46 is gone (filled with liquid fuel) and all the air and vapor in the tank has collected in the forward portion 64 of the tank 26 thus enlarging vapor dome 44. The rearward vapor vent valve 40 being generally restricted in movement to the rearward portion 66 is submerged in liquid fuel and thus closed, however the forward vapor vent valve 38 remains floating and thus open to the vapor dome 44.

Figure 7:
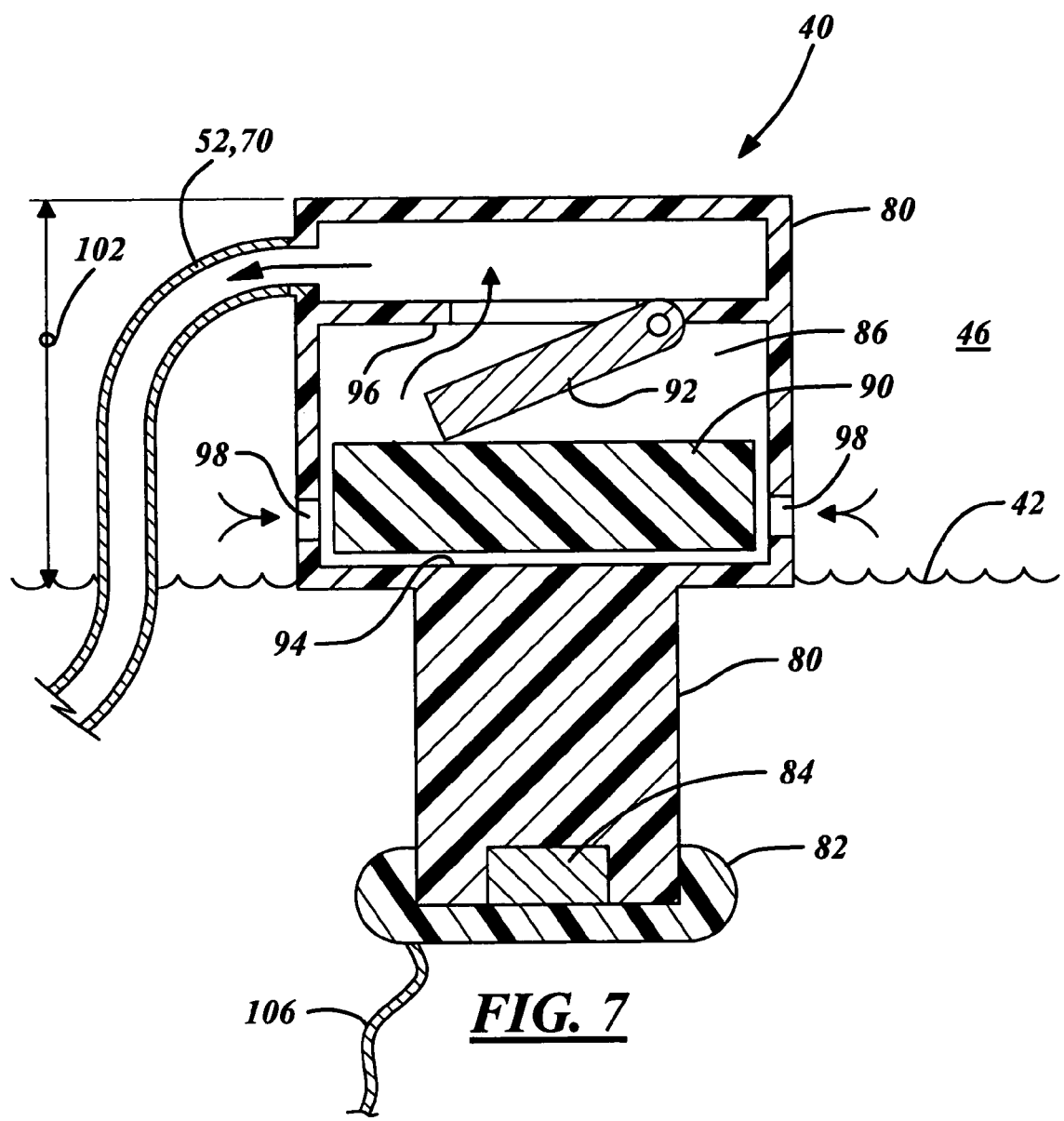
FIG. 7 is a cross section of a buoyant vapor vent valve of the fuel tank assembly in an open position.
Figure 8:
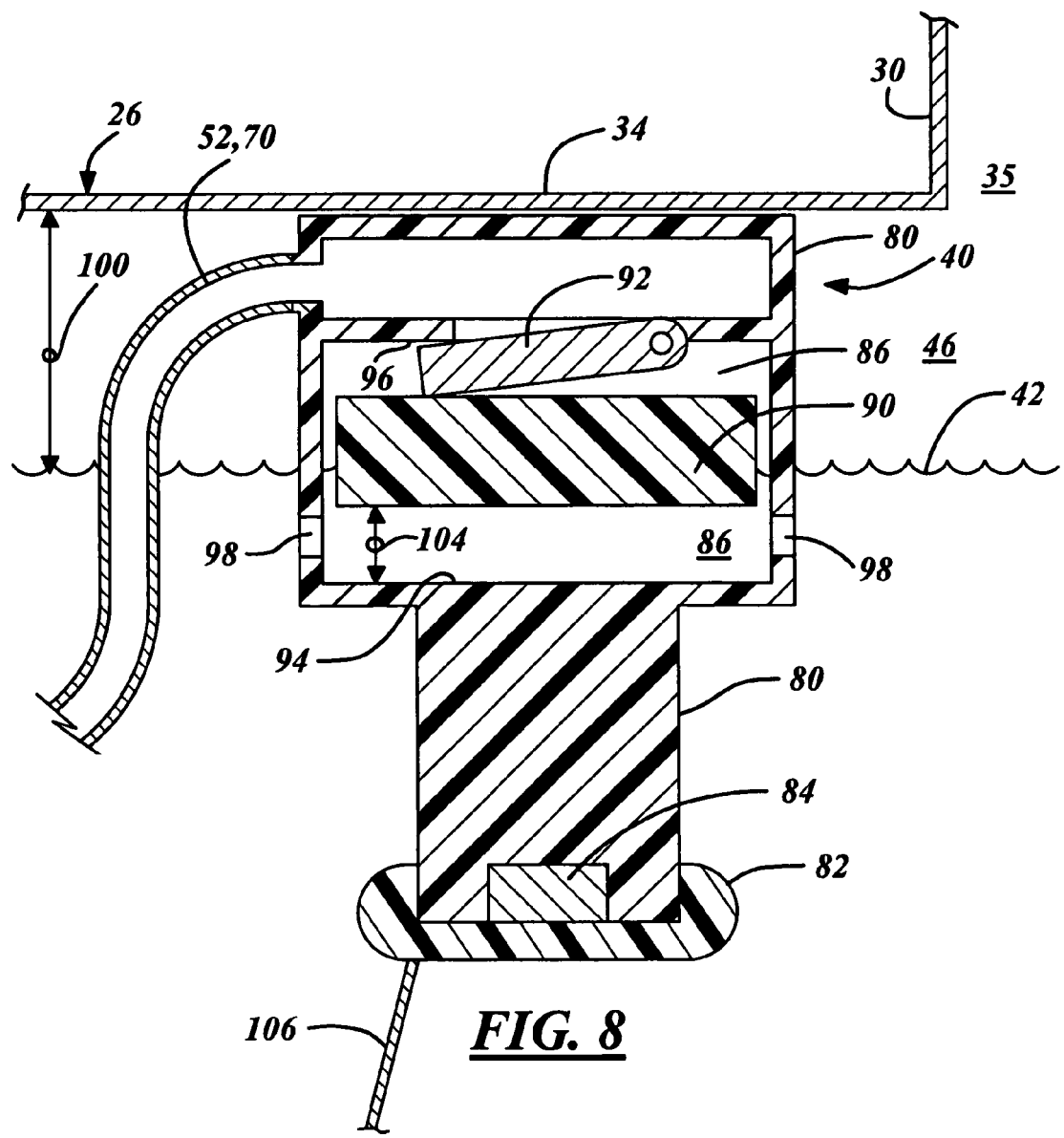
FIG. 8 is a cross section of the buoyant vapor vent valve of the fuel tank assembly in a closed position.

As best illustrated in FIG. 7-8, the housing 80 of each vent valve 38, 40 is preferably of closed cell foam construction thus providing the necessary buoyancy. However, a buoyancy jacket could be used over a non-buoyant housing, a housing with a closed chamber or "float" therein could be used, or the like. An optional ballast 84 may be provided at a lower end of the housing 80 along with the bumper 82. Preferably, each valve 38, 40 has a submergible compartment 86 of the housing 80 that contains a float 90, a seat 96, and a head valve 92 between the float and seat. Preferably the head 92 is pivotally carried by the housing and underlies the seat 96 so that the head is movably biased by gravity to an open position as shown in FIG. 7. When the vapor vent valve 38, 40 is open, the float 90 generally rests upon a bottom 94 of the compartment 86. In operation, when the vapor vent valve 38, 40 is submerged in liquid fuel and the fuel surface 42 rises above the ports 98 of the compartment 86, the float 90 also rises with respect to the housing and moves the valve head 92 with it until the head sealably contacts the valve seat 96 thereby closing the valve 38, 40 and preventing liquid fuel from entering the vapor tentacle 52, as best shown in FIG. 8.

As best illustrated in FIGS. 7 and 8, the minimum required vapor dome volume, whether it is located in the primary vapor dome 46 or migrates over to the secondary vapor dome 44, or both, is maintained by restricting buoyancy movement of the valves 38, 40. For instance, FIG. 8 illustrates the tank wall 34 resisting the natural buoyant force of valve 40 causing the compartment 86 to partially fill with fuel, and the float 90 to rise thereby closing the valve. In this illustration the minimum vapor dome volume is represented by the height between fuel surface 42 and overhead wall 34 (designated by arrow 100 in FIG. 8). Height 100 is generally the difference between the height of the valve 40 above the fuel surface 42 when unobstructively floating (see arrow 102 in FIG. 7) minus the vertical throw of float 90 (see arrow 104 in FIG. 8). Other ways to preserve a minimum vapor dome in the tank 26 include use of a tether 106 extended generally between the bumper 82 or lower end of the valve 40 and the bottom 78 of the tank 26, or the tentacles 50, 52 can be constructed to generally limit vertical valve movement.

Each valve 38, 40 is roll-over protected or responsive because should the vehicle 24 and tank 26 overturn, the tentacles 52 restrain the vapor vent valves 38, 40 from rotating thus resisting the movement of inertia created by ballasts 84. With the vapor vent valve 38, 40 thus inverted, the valve head 92 closes by gravity with the pressure head of any fuel above it acting upon it. If no fuel enters compartment 86 (through holes 98) the float 90 also bears on the head 92 and if liquid fuel enters the compartment the float buoyancy causes the float 90 to press against the now inverted bottom 94 of the submerged compartment 86, thus the float 90 does not act upon the valve head 92.

While the forms of the invention herein disclosed constitute presently preferred embodiments, many others are possible. For instance, if the vent valves 38, 40 do not require a roll-over protection feature, the valve head 92 could be buoyant and the float 90 would not be required at all. It is not intended herein to mention all the possible equivalent forms or ramifications of the invention. It is understood that the terms used herein are merely descriptive, rather than limiting, and that various changes may be made without departing from the spirit or scope of the invention.

We claim:

1. A fuel storage system for a vehicle comprising:
a fuel tank having a wall defining a fuel chamber for containing a liquid fuel;
a vapor dome of the fuel chamber located between a surface of the liquid fuel and the wall when the fuel tank is in its normal attitude when the vehicle is on a horizontal plane; and
a fuel vapor assembly having:
a conduit extending through the wall,
a buoyant vapor vent valve constructed and arranged to be in an open position when the vapor vent valve is floating upon the fuel surface and generally in the vapor dome and constructed and arranged to be in a closed position when the vapor vent valve is at least partially submerged by a predetermined distance in liquid fuel and against a biasing buoyancy force from below the vapor vent valve, and
an elongate flexible fuel vapor tentacle extending between the conduit and the vapor vent valve for the flow of fuel vapor out of the fuel tank when the vapor vent valve is in the open position, received in the interior of the fuel tank, and constructed and arranged to restrict the vapor vent valve from flipping a complete one hundred and eighty degrees with respect to the fuel tank.

2. The fuel storage system set forth in claim 1 further comprising a vapor canister communicating with the vapor vent valve through the conduit and flexible vapor tentacle when the vapor vent valve is in the open position.

3. The fuel storage system set forth in claim 1 wherein the vapor vent valve is constructed and arranged to be roll-over protected.

4. The fuel storage system set forth in claim 1 wherein the vapor vent valve is one of a plurality of vapor vent valves spaced apart in the fuel tank and the flexible vapor tentacle is one of a plurality of flexible vapor tentacles and each one of the plurality of flexible vapor tentacles communicates with a respective one of the plurality of vapor vent tentacles.

5. The fuel storage system set forth in claim 4 further comprising a manifold of the conduit disposed in the fuel tank and connected to each one of the plurality of flexible vapor tentacles.

6. The fuel storage system set forth in claim 5 further comprising:
an access hole carried by the fuel tank;
a flange sealably covering the access hole; and
the conduit extending through the flange and to the manifold supported by the flange.

7. The fuel storage system set forth in claim 6 wherein the manifold is constructed and arranged to swivel with respect to the flange.

8. The fuel storage system set forth in claim 5 wherein at least one of the plurality of vapor vent valves is disposed at a higher elevation than the manifold when the fuel tank is substantially full.

9. The fuel storage system set forth in claim 5 wherein at least one of the plurality of vapor vent valves is in the open position and at least one of the plurality of vapor vent valves is in the closed position when the fuel tank is substantially full and the vehicle is substantially not horizontal.

10. The fuel storage system set forth in claim 4 further comprising:
a forward vapor vent valve of the plurality of vapor vent valves constructed and arranged to float only in a forward portion of the fuel chamber; and
a rearward vapor vent valve of the plurality of vapor vent valves constructed and arranged to float only in a rearward portion of the fuel chamber.

11. The fuel storage system set forth in claim 1 further comprising a housing of the vapor vent valve made of closed cell foam.

12. The fuel storage system set forth in claim 1 further comprising a low fuel bumper engaged to a bottom of the vapor vent valve for buffering noise when the vapor vent valve contacts a bottom of the fuel tank.

13. The fuel storage system set forth in claim 1 wherein the vapor vent tentacle is convoluted plastic tubing.

14. The fuel storage system set forth in claim 1 further comprising a flow through swivel connector of the flexible vapor tentacle.

15. The fuel storage system set forth in claim 1 further comprising a buoyant jacket wrapped about a housing of the vapor vent valve for providing buoyancy.

16. A fuel storage system for a vehicle comprising:
a fuel tank having a wall defining a fuel chamber for containing a liquid fuel;
a vapor dome of the fuel chamber located between a surface of the liquid fuel and the wall when the fuel tank is in its normal attitude when the vehicle is on a horizontal plane; and
a fuel vapor assembly having:
a conduit extending through the wall,
a buoyant vapor vent valve constructed and arranged to be in an open position when the vapor vent valve is floating upon the fuel surface and generally in the vapor dome, constructed and arranged to be in a closed position when the vapor vent valve is at least partially submerged by a predetermined distance and against a biasing buoyancy force from below the vapor vent valve, and constructed and arranged to be roll-over protected, and
an elongate flexible fuel vapor tentacle extending between the conduit and the vapor vent valve for the flow of fuel vapor out of the fuel tank when the vapor vent valve is in the open position, received in the interior of the fuel tank, and the elongate flexible vapor tentacle restricts the vapor vent valve from flipping a complete one hundred and eighty degrees with respect to the fuel tank.

17. A fuel tank assembly for a combustion engine comprising:
a fuel tank having a wall defining a fuel chamber for containing liquid fuel therein;
a vapor pocket located between a surface of the liquid fuel and the wall;
a vapor vent valve inside the tank;
a housing of the vapor vent valve constructed and arranged to be disposed in a vapor pocket while floating in the surface of the liquid fuel and the housing changes position with respect to the wall as the surface of the liquid fuel changes position relative to the wall; and
a valve head of the vapor vent valve carried by the housing and constructed and arranged to be open when the housing projects above the liquid fuel surface by a pre-determined height and to close when the housing is at least partially submerged in the liquid fuel to reduce the pre-determined height by at least a threshold amount; and
an elongate and flexible fuel vapor tentacle connected to the vapor vent valve for fuel vapor flow out of the fuel tank when the vent valve is open and constructed and arranged to restrain the vapor vent valve from rotating with respect to the fuel tank.

18. The fuel tank assembly set forth in claim 17 wherein the housing is buoyant and the vapor vent valve closes when the housing is at least in part submerged in liquid fuel against the force of the housing buoyancy and the float valve head moves upward against a valve seat carried by the housing.

\* \* \* \* \*